INVENTOR.
RAYMOND B. LARSEN

May 26, 1970  R. B. LARSEN  3,514,679

DIGITAL PULSE MOTOR CONTROL CIRCUIT

Filed Nov. 2, 1967  3 Sheets-Sheet 3

INVENTOR.
RAYMOND B. LARSEN
BY
John E. Reilly
ATTORNEY

United States Patent Office 3,514,679
Patented May 26, 1970

3,514,679
DIGITAL PULSE MOTOR CONTROL CIRCUIT
Raymond B. Larsen, Riverton, Wyo., assignor, by mesne assignments, to Datel Corporation, Falls Church, Va., a corporation of Delaware
Filed Nov. 2, 1967, Ser. No. 680,086
Int. Cl. H02p 5/16
U.S. Cl. 318—314
11 Claims

ABSTRACT OF THE DISCLOSURE

The speed of a DC motor can be accurately determined and controlled by generating digital pulses representative of actual motor speed and applying each pulse and inversion of each pulse to a novel form of discriminating circuit having a pair of one shot delays in which the time constants of the delays are equated to the desired motor speed. When the motor is above desired speed, the positive-going leading edges of each pulse and inverted pulse will overlap within the time constants; or if the motor is below desired speed, no overlapping of the leading edges occurs within the time constants. A gating circuit is enabled only in response to the latter condition to apply motor energizing pulses until the motor reaches the constant speed selected.

---

This invention relates to motor speed control circuits, and more particularly relates to a digital pulse discriminating circuit for accurately sensing and controlling the speed of rotation of a DC motor and being specifically adaptable for use in controlling the speed of recording and sound reproducing mediums.

In magnetic tape recording units for data processing systems, it is important that the tape be driven at a constant, closely controlled rate of speed for writing or reading magnetic characters thereon. In the past, control circuitry has been devised for controlling both the speed and direction of advancement of the tape by accelerating the tape to a constant speed level and maintaining the tape at that level for writing or reading magnetic characters thereon. Typical speed control devices of this type provide a source of periodically recurring signals to represent the desired speed of the motor and a second source of signals to indicate actual motor speed. The speed of rotation is therefore controlled by correlating the occurrence of pulses representing actual motor speed with those representing desired motor speed and either energizing or deenergizing the motor depending upon whether the motor is below or above the constant speed level selected. Inherent in systems of the type described is the difficulty of synchronizing the occurrence of signals representative of desired motor speed with those signals representing actual motor speed for the reason that several pulses from each source must be compared before an accurate determinition can be made of actual motor speed; also, each pulse generated by the motor must be compared not only with the occurrence of the preceding pulse but with the occurence of other pulses from an external source not synchronized with the system. As a result, undesirable time lags are experienced in accelerating the motor to the selected speed level and in maintaining the constant speed level.

It is therefore highly desirable to provide a discriminating circuit that is capable of determining and controlling motor speed solely in response to generation of each pulse representative of actual motor speed whereby to rapidly accelerate the motor to the selected speed level and to effect extremely close and sensitive control in holding the motor at the constant speed level. In this way, a separate source of signals or pulses to indicate desired motor speed is eliminated, response time is materially reduced and accuracy of reading and writing on the tape at the desired constant speed level is greately increased. Moreover, effectiveness of the motor over a wide range of speed is improved by minimizing substitution for and adjustment of elements in the circuit for each different constant speed level selected.

Moreover, by virtue of the manner in which each pulse is sensed and discriminated, the control circuit of the present invention is ideally suited for use in sound reproduction, since in a manner to be described the circuitry is capable of imposing extremely accurate control over motor speed by measuring pulse width, or spacing, as opposed to conventional measurement of pulse amplitude, thereby materially reducing the noise factor.

It is therefore an object of the present invention to provide for a novel and improved motor speed control circuit which is adaptable for use in maintaining a constant speed level in DC or universal motors in an accurate and highly dependable manner.

It is another object of the present invention to provide in a magnetic tape recording system for a digital pulse reoccurrent frequency discriminating circuit capable of accurately controlling the speed of advancement of a magnetic tape with minimum response time required in effecting reversal, acceleration and deceleration of the tape, and is further readily adjustable to control the motor over a wide range in speed.

It is a further object of the present invention to provide in recording and sound reproducing systems for a novel and improved form of control circuit which is operative solely in response to application of each pulse representative of actual motor speed both to sense and control desired motor speed; and more specifically wherein the control circuitry of the present invention is readily conformable for use in a data processing system to effect rapid acceleration of the tape drive motor to a constant speed level, maintain the motor at the constant speed level in writing characters on tape, followed by controlled reversal of the tape in reading each character written and accelerated movement and spacing of the tape before writing each next block of characters in succession.

In accordance with the present invention, pulses proportional to actual motor speed may be generated by a light-sensitive element or equivalent means. Each pulse generated is inverted, and both the pulse and inverted pulse are individually applied through separate monostable multivibrators or one shots where the time constant of each is equated to the desired constant speed level of the motor. A pulse width greater than the time constant of the multivibrator is indicative of a speed condition less than the constant speed level desired. Accordingly, if the pulse width is greater than the time constant selected, the positive-going portion of the inverted pulse will not activate its one shot delay until after the first one shot delay has timed out in response to the positive-going pulse; or in other words, the pulses are "non-overlapping." Conversely, if the pulse width is less than the time constant selected, the positive-going portion of the inverted pulse will activate its one shot delay before the first one shot delay has timed out and the pulses are "overlapping." A suitable gating circuit is enabled only in response to the former non-overlapping condition, and through a drive control circuit will control the application of a motor energizing pulse or signal to the motor drive. By discriminating between pulse widths, extremely high resolution within one-tenth of a millisecond is possible in comparing each pulse generated so that the motor may be rapidly accelerated to speed and accurately held at the speed level over the desired number of counts, or time interval, thereby achieving accurate recording and faster response time with greater bit density; and in general the system provides a highly accurate, sensitive means of control for a motor drive.

The above and other objects of the present invention will become more readily appreciated and understood from a consideration of the following detailed description of a preferred form of invention when taken together with the accompanying drawings, in which.

Figure 1:
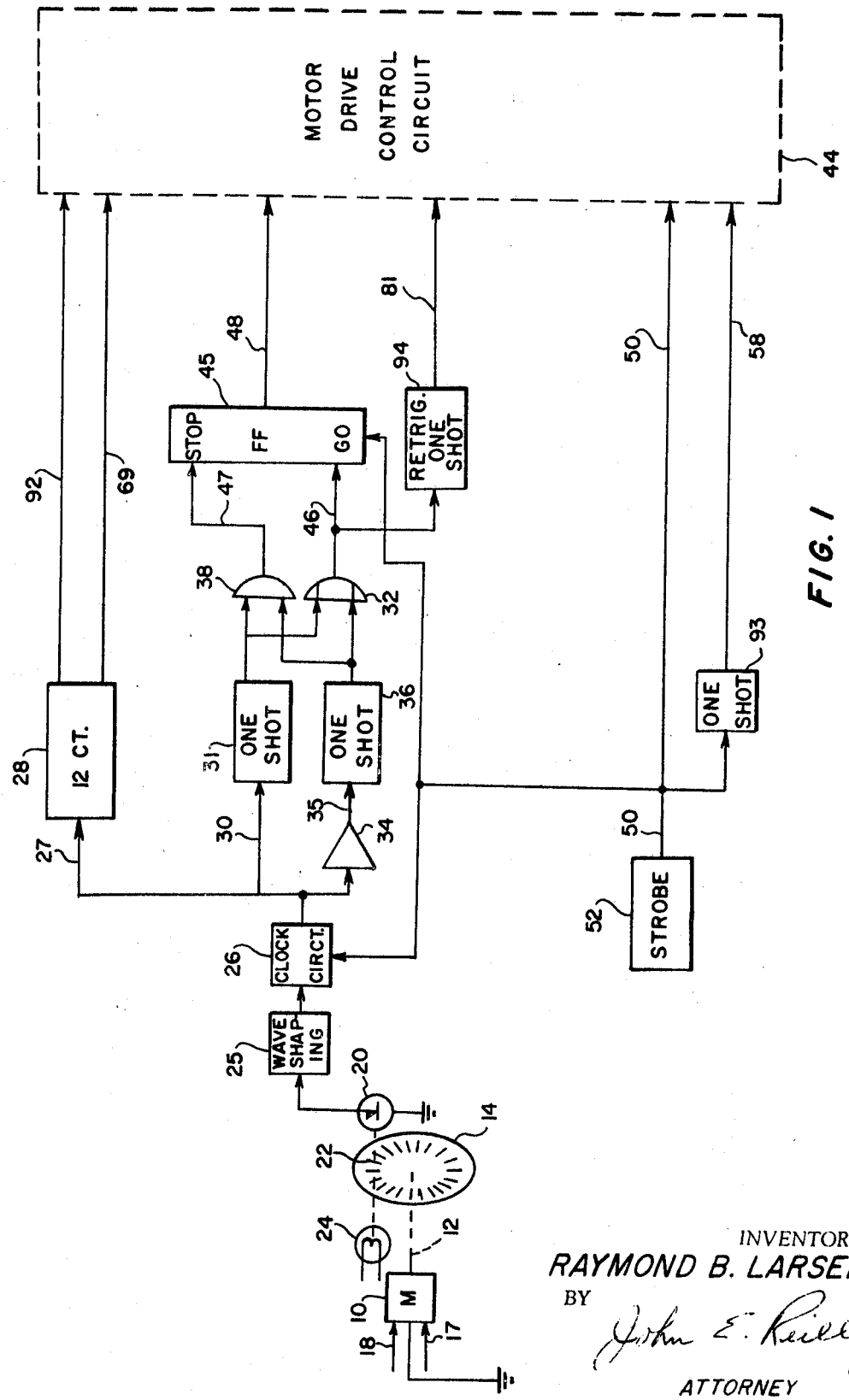
FIG. 1 is a schematic diagram of a preferred form of digital control circuit for a DC motor.

The present invention may be best exemplified by reference to its use in the storage and retrieval of information on magnetic tape in a data processing system. Specifically, in the embodiment shown in FIG. 1, a tape drive motor 10 has a common drive shaft 12 for a tape drive capstan, not shown, and a photo-timing disk 14. The magnetic tape may be trained for advancement in a customary manner between the capstan and pinch rollers and a conventional head containing suitable read/write amplifiers, not shown, is disposed for reading and writing characters on the tape. In a conventional manner, actual motor speed is sensed by a photo diode 20 which will produce a timing pulse in response to rotation of each of the series of slots 22 disposed on the outer periphery of the timing disk 14 past a light source 24, each timing pulse being amplified and passed through a suitable wave-shaping circuit 25, such as, a Schmitt trigger for delivery to a speed sensing circuit.

The motor 10 is representative of various DC motors that may be employed in the preferred form. For instance, a typical DC motor is the printed circuit motor manufactured and sold by Photo Circuits Corporation of Glencove, N.Y. and being characterized by having very low inertia and resistance. In use, the direction of rotation of the motor may be reversed merely by reversing the polarity of the armature, this being done as illustrated by forward or reverse energizing pulses applied either through lead 17 or 18, respectively, from the motor drive control circuit of FIG. 2 to the armature of the motor 10.

In the form shown, the digital control circuit sequentially controls writing of each character on tape and thereafter advances the tape a predetermined interval to form an inter-record gap prior to writing the next character block. Broadly, in writing information on tape, the motor is rapidly accelerated to the constant speed level within a specified number of counts, a series or block of characters is written over a selected number of counts, and the motor is then advanced a predetermined number of counts to form an inter-record gap between characters. At the end of the gap the motor may be braked to prevent the use of excess tape prior to writing each next character block in succession.

Figure 3:
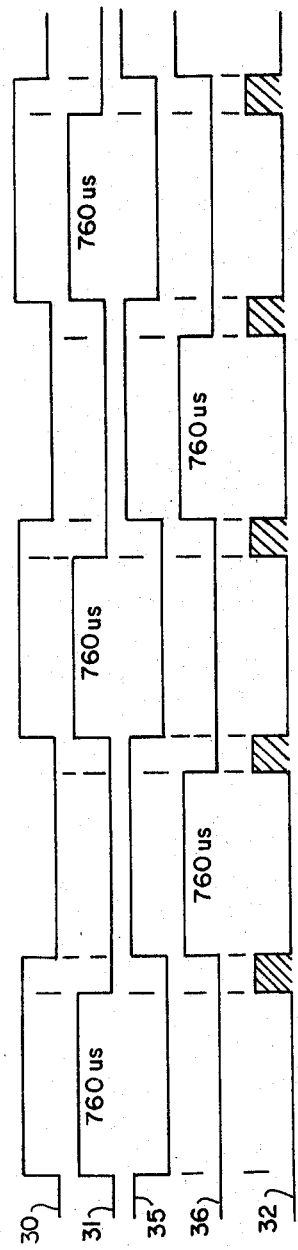
FIGS. 3 and 4 illustrate the relationship between pulses representative of actual motor speed and of selected speed when the motor is running at less than and greater than the constant speed level, respectively.
Figure 4:
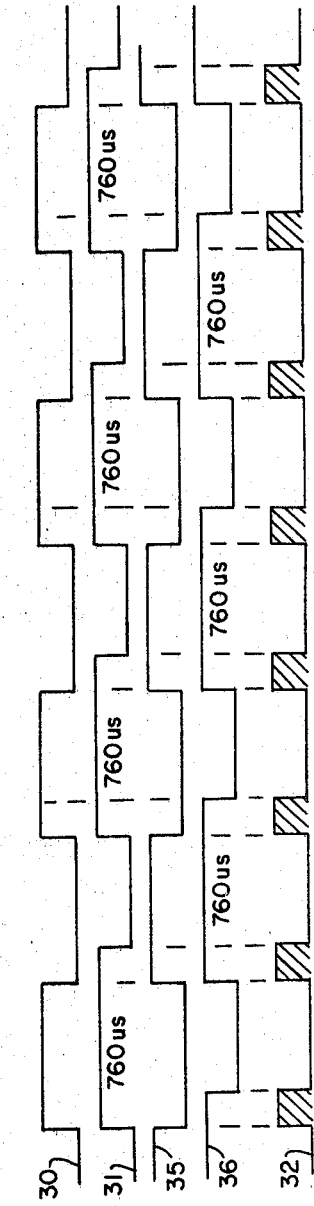

In order to sense and control motor speed, the timing pulses from the wave-shaping circuit 25 are applied through a clock circuit 26 to a first line or channed 30, including a one shot multivibrator 31, to one input leg of OR gate circuit represented at 32 and also to one input leg of AND gate 38. Simultaneously, pulses are applied through inverter 34 to a second line or channel 35, including a one shot multivibrator 36, to one input leg of AND gate 38 and also to one input leg of OR gate 32. The clock circuit 26 may be comprised of one or more flip flop stages which derive clock pulses from the timing pulses applied to the lines 30 and 35. The clock pulses are generated and applied both through line 27 to time a counting circuit, represented as a Count-By-Twelve circuit 28, and through line 69 to time the reading and writing of characters on tape in a manner to be described. However, the clock circuit in no way affects the timing pulses to the lines 30 and 35 through inverter 34 other than to be simultaneously cleared to synchronize the clock pulses with the timing pulses. From the timing pulse forms shown in FIGS. 3 and 4, the pulses applied through lines 30 and 35 are 180° out of phase, the inverted pulse 35 going positive 180° after the pulse through line 30, and it will be evident that the width of each positive and negative-going portion of each pulse when applied to one shot 31 and one shot 36 are representative of actual motor speed and will vary in direct relation to motor speed. Each one shot is given the same time constant K, here designated as 760 microseconds, the time constant being selected to represent the desired constant speed level of the motor. Where the pulse width is greater than K, as shown in FIG. 3, representing an actual motor speed less than desired motor speed, the one shot 31 will "time out" before the one shot 36 is triggered by the positive-going portion of the inverted pulse. However, as shown in FIG. 4, if the pulse width is less than the time constant K of the one shots 31 and 36, the positive-going portion of the inverted pulse will trigger the one shot 36 before the one shot 31 has timed out; that is to say, the positive-going output of the one-shot 36 will overlap at least the trailing end of the positive-going output of one shot 31. Since the AND gate 38 requires simultaneous presence of signals from the one shots 31 and 36 in order to be enabled, the logic of the gating circuit 38 is such that the gate is enabled only when each pulse and inverted pulse are overlapping to indicate a speed condition greater than the desired motor speed represented by the time constant K. If the pulses are not overlapping to indicate a speed less than the desired motor speed, as represented in FIG. 3, the gate 38 will not be enabled, but the gate 32 will be enabled to apply a motor energizing signal to a motor drive circuit represented at 44.

In practice, the gating circuits 32 and 38 may control the condition of a reset flip flop 45. Thus when the OR gate 32 is enabled to indicate a condition below the desired speed level, the flip flop 45 is toggled through output line 46 from gate 32 to apply motor energizing pulses to the armature of the motor. Conversely, if the OR gate is not enabled and the AND gate enabled to indicate a condition above the desired speed level, the flip flop 45 is toggled through output line 47 from gate 38 to prevent application of motor energizing pulses through the motor drive circuit to the armature of the motor. For the type of motor described, the motor is energized to the constant speed level, then permitted to coast or run by inertia until its speed is reduced beneath the selected speed level whereupon the next timing pulse will enable the OR gate 32 and apply an energizing signal to the motor drive circuit 44.

Figure 2:
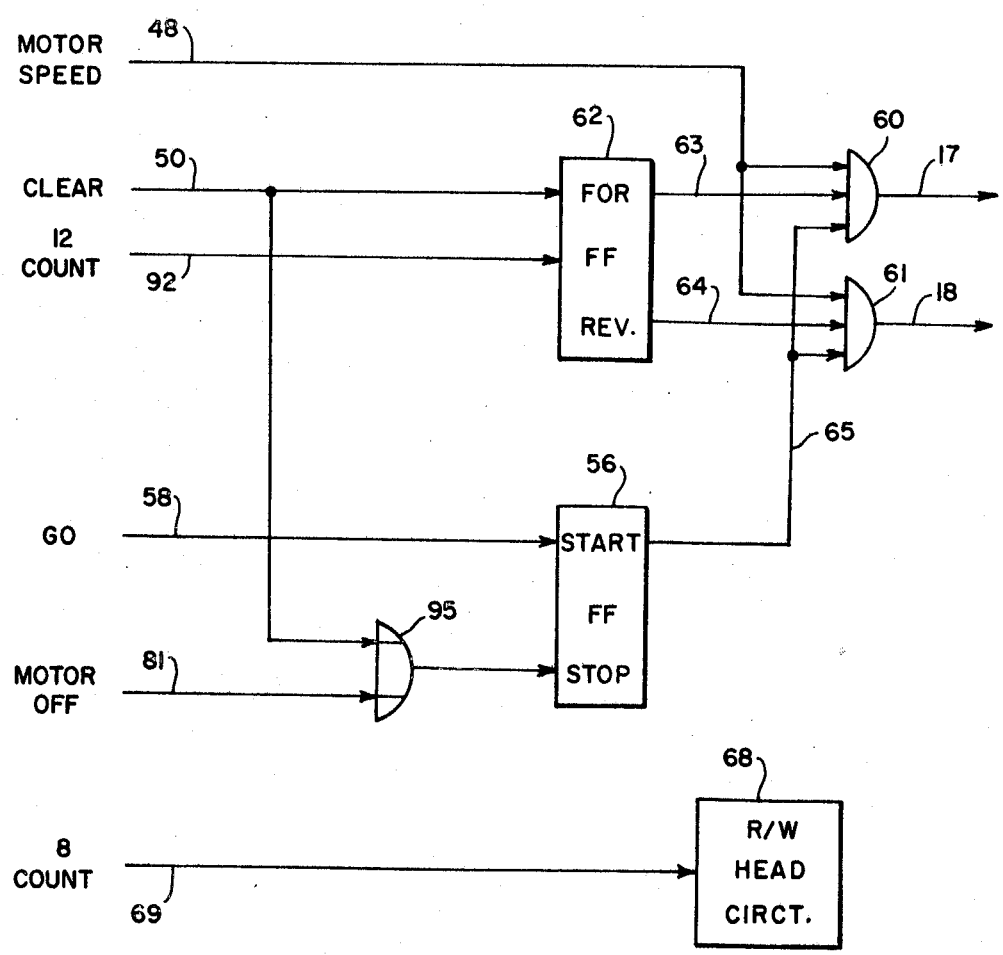
FIG. 2 is a schematic diagram of one suitable form of motor drive circuit for the digital control circuit shown in FIG. 1.

The speed sensing circuit described can be readily utilized, without more, as a sensitive and accurate means of controlling speed of the motor. In this relation, the time constants selected for the one shots 31 and 36 will determine the constant speed level of the motor for a given number and spacing of slots of the phototiming disk 14, and of course speed adjustment may be made either by changing the time constant of the one shots or the number of slots on the timing disk. It will be further apparent that the speed sensing circuit described can be utilized in combination with various logical circuitry to effect a change in speed or in direction in performing different operations. For the purpose of illustration, one suitable form of motor drive circuit for a data processing system is schematically shown in FIG. 2. Broadly, the circuit is designed to drive the motor in a forward direction for writing or reading characters on tape; also to advance the tape to establish gaps or intervals between blocks of characters written, followed by braking the motor at the end of the inter-record gap. In order to energize the motor drive circuit, a read or write signal activates the strobe 52 from which a clear signal is applied over line 50 in order to clear all circuits in the system before each read or write operation. A one shot 93 has a predetermined time constant so that when the clear signal 50 expires, a "go" signal is applied from the one shot 93 through line 58 to toggle the flip flop 56; in turn, the flip flop 56 then applies an enabling signal through line 65 to input gate legs of AND gate circuits 60 and 61. A motor energizing signal is delivered through one of the lines 17 or 18 to the armature of the motor when one of the AND gates 60 or 61 is enabled by a motor speed signal delivered through line 48 from the motor speed sensing circuit in order to accelerate the motor to the constant speed level desired. The motor may be driven in either the forward or reverse direction, as determined by the "forward" or "reverse" condition of a flip flop circuit 62 having output lines 63 and 64 going to gates 60 and 61, respectively. Initially, the clear signal will trigger the circuit 62 to enable the AND gate 60 and drive the motor in a forward direction for reading or writing information on tape over a predetermined number of counts under the control of the counting circuit 28.

As a preliminary to reading or writing the characters constituting each block of information, a sufficient number of pulses is applied at the beginning of each character block to permit the motor to accelerate to the desired constant speed level in the forward direction. In practice, it has been found that for the time constant and motor speed selected two pulses at the beginning of each block are more than sufficient to accelerate the motor to the desired speed level, due to the rapid response attained in the motor speed sensing circuit. Accordingly, reading or writing characters on tape may start with the third pulse and continue through a succession of pulses depending upon the number of characters comprising each block. If, for example, eight characters are to constitute each block, the third through tenth clock pulses applied over the control line 69 from the Count-By-Twelve circuit 28 to the read/write circuit 68 are utilized to time the writing of the characters on the tape.

After completing each character block, the tape will continue in the forward direction for an additional number of pulses or counts to form an inter-record gap between character blocks. If the tape is to be advanced through two counts in forming the inter-record gap, i.e., the eleventh and twelfth clock pulses from the Count-By-Twelve circuit 28, the circuit 28 may be provided with a set of conditions which upon receiving the twelfth clock pulse in succession from the clock circuit is operative to apply a signal through control line 92 and trigger the flip flop 62 to its "reverse" side at the end of the twelfth count. The next motor energizing signal in succession from the line 48 is therefore applied through AND gate 61 and lead 18 to impart a reversing signal to the motor.

The reversing signal applied to the motor drive will therefore have the effect of rapidly decelerating the motor at the end of the inter-record gap prior to writing each next character in succession. At the same time, deceleration of the motor will cause a substantial increase in the time lag between the timing pulse that generated the reversing signal and the next timing pulse in succession. Accordingly, the increased spacing between timing pulses when the motor is decelerated may be utilized as a means of deenergizing the motor at the end of the inter-record gap. In the circuitry shown this is accomplished by a retriggerable one shot 94 which receives pulses from line 46 and will time out and generate an output pulse on line 81 when the spacing or time lag between timing pulses is greater than the time constant of the one shot. The pulse generated is applied through OR gate 95 in turn to switch flip flop 56 to the "stop" position and deenergize the motor drive circuit until the next "go" signal is applied from the one shot 93 to toggle the flip flop 56 to the "go" position for the next block of characters. In this relation, the "go" signal is set to hold the flip flop 56 in the "go" position for a longer time interval than the time constant of the delay 94 in order that the delay 94 will not accidentally toggle the flip flop 56 to the "stop" side when the motor is initially accelerated.

It will be apparent that the motor drive circuit may be modified to reverse the tape at the end of each character block for the purpose of error-checking the information written. For instance, instead of braking and deenergizing the drive circuit at the end of the twelfth pulse, the drive circuit may simply be reversed by the Count-By-Twelve circuit 28 through twelve counts to the beginning of the character block then once again reversed to run in the forward direction past the character block and for an additional number of pulses to establish the inter-record gap followed by braking and deenergizing the motor drive circuit at the end of the gap. The information may be error-checked either when running the motor in reverse or in the forward direction past the characters written and the error-checking circuit may suitably comprise a counter to count the number of characters written in each block and to apply an error signal if more or less than the predetermined number of characters is written. This error signal may be applied to a keyboard control circuit both to lock the keyboard and to provide a visual error signal to the operator instructing the operator to rewrite the character. Also the error signal may place the read/write circuit 68 in the "record" position to re-record the character as it is rewritten by the operator over the erroneous character.

In the motor drive circuit it will be apparent to those skilled in the art that only the basic logic of the circuit is shown and described sufficient to apprise of a typical application and use of the speed sensing circuit of the present invention. In practice, additional elements and control circuitry necessarily would be employed to correlate operation of the motor with the entire recording system. For example, information signals would be transmitted to the read/write circuit to relate whether to read or write, or to do neither. In this connection, various logical circuitry may be employed in cooperation with the digital control circuit to perform a number of functions where close accurate speed control is required.

From the foregoing, it is possible to determine actual motor speed from the width of each pulse and, within the time constant of the one shots, to sense whether or not the motor is up to speed and, if below speed, to transmit an energizing signal to the motor. For example, in selecting a time constant of 760 microseconds duration it is possible to sense motor speed by resolving overlaps in pulse width within one-tenth of a microsecond. In this way, detection of amplitude variation and associated noise problems are avoided, and accordingly the speed sensing circuit is ideally suited for use in sound and sound reproduction systems.

In addition, the nature of the circuit is such that each motor energizing signal will be applied over a time interval directly related to the width of each timing pulse through the speed sensing circuit. In this way, the motor will receive an energizing signal of longer duration when running at slower speeds than at faster speeds, and accordingly the motor is energized to the level required to maintain the constant speed selected.

While a preferred embodiment of the present invention is set forth and described herein, as well as its use in a data processing system, it is to be understood that various modifications and changes may be made therein without departing from the spirit and scope of the present invention as defined by the appended claims and reasonable equivalents thereof.

What is claimed is:

1. A digital motor control circuit for driving a motor at a constant speed comprising
    timing pulse generating means to generate a succession of timing pulses at a rate proportional to actual motor speed and inverter means to simultaneously generate the inversion of each timing pulse generated,
    timing pulse sensing means having a predetermined time constant representative of a selected motor speed being operative to compare the widths of each timing pulse and inverted timing pulse with the predetermined time constant of said timing pulse sensing means, said timing pulse sensing means being activated when the widths of each timing pulse and inverted timing pulse are greater than the predetermined time constant to designate an actual speed condition less than the selected motor speed,
    means responsive to activation of said timing pulse sensing means to generate a motor energizing signal, and
    means for applying each of said motor energizing signals to said motor.

2. A digital motor control circuit according to claim 1, said timing pulse sensing means being further characterized by first and second delay members each having the same time constant corresponding to the selected motor speed,
    means for applying each timing pulse and the inversion of each timing pulse generated simultaneously to said first and second delay members, said first and second delay members being operative to compare the positive-going leading edges of each timing pulse and inversion of each timing pulse with the predetermined time constants of said first and second delay members, and
    said timing pulse sensing means being enabled by said first and second delay members to apply a motor energizing pulse to the motor only when the time lag between the positive-going leading edge of each pulse and inverted pulse is greater than the predetermined time constant of said first and second delay members.

3. A digital control circuit according to claim 1 further including motor braking means for applying a reverse energizing signal to the motor after the motor has been driven in a forward direction for a predetermined number of counts, and means for applying a motor deenergizing pulse to the motor a predetermined time interval after the reverse energizing signal is applied.

4. A digital motor control circuit for driving a DC motor at a constant speed comprising pulse generating means being driven by said motor to generate pulses at a rate corresponding to motor speed,
    a discriminator circuit including first and second delays having the same time constant representative of desired motor speed,
    means for applying each timing pulse and the inversion of each timing pulse to said first and second delays,
    bi-stable means having first and second stable positions,
    means being operative to energize said motor only when said bi-stable means is in its first stable position,
    gating means being selectively enabled only when the time lag between the positive-going leading edge of each timing pulse and the positive-going leading edge of the inverted timing pulse is greater than the time constants of said delays to set said bi-stable means in the first position, and
    second gating means being selectively enabled only when the time lag between the positive-going leading edge of each timing pulse and of each inverted timing pulse is less than the predetermined time constant to set said bi-stable means to the second position to deenergize said DC motor.

5. A digital motor control circuit according to claim 4, further including motor braking means selectively enabled to apply a reverse energizing pulse to decelerate the motor, and means including a third delay responsive to a predetermined spacing between motor energizing pulses greater than the time constant of said third delay to apply a motor deenergizing pulse to deenergize said DC motor.

6. In a recording system wherein a recording medium is adapted to be reversibly driven at a constant rate of speed by a DC motor for storage and retrieval of information on the recording medium, the combination comprising
    motor drive means including forward and reverse drive means selectively enabled to drive the motor alternately in a forward and reverse direction, respectively,
    means to generate timing pulses at a rate proportional to the speed or rotation of the motor,
    means for generating a motor energizing signal including means for applying each signal to said forward and reverse drive means whenever the width of a timing pulse is greater than a predetermined width representative of the desired motor speed,
    means enabling said forward drive means for driving the motor in a forward direction when a motor energizing signal is applied thereto, and
    a timing circuit including reverse control means to disable said forward drive means and to enable said reverse drive means for driving the motor in the reverse direction.

7. In a recording system according to claim 6, said means for applying motor energizing signals being characterized by applying each signal over a time interval correlated with the spacing between timing pulses activating said delay means to generate each respective signal.

8. In a recording system according to claim 6, said signal generating means being characterized by including a discriminator circuit having first and second one shots each one shot having the same time constant corresponding to the selected motor speed, means for applying each timing pulse and the inversion of each timing pulse simultaneously to said first and second one shots, said first and second one shots comparing the positive-going leading edges of each pulse and inversion of each pulse with the time constants, gating means being selectively enabled by said first and second one shots to apply a motor energizing pulse to the motor only when the time lag between the positive-going leading edges of each pulse and inverted pulse is greater than the time constant of said first and second one shots.

9. In a recording system according to claim 8, further including a clock circuit interposed between said timing pulse generating means and said discriminator circuit to generate clock pulses in response to application of timing pulses from said timing pulse generating means.

10. In a recording system according to claim 6, further including motor braking means for applying a reversing signal to the motor after the motor has been driven in a forward direction over a predetermined number of counts, and motor deenergizing means responsive to application of said motor reversing signal to disable said forward and reverse drive means.

11. In a recording system according to claim 10, said timing circuit further including bi-stable means having first and second stable positions to selectively enable each of the forward and reverse drive means, and means operative to set said bi-stable means to the second stable position for driving the motor in a reverse direction after the motor has been driven a predetermined number of counts in the forward direction.

(References on following page)

References Cited

UNITED STATES PATENTS

| | | | |
|---|---|---|---|
| 2,769,949 | 11/1956 | Stratton | 318—318 |
| 3,110,853 | 11/1963 | Jones | 318—314 |
| 3,182,243 | 5/1965 | Burr | 318—341 |
| 3,327,053 | 6/1967 | Arimura et al. | 318—318 |
| 3,328,602 | 6/1967 | Taylor | 307—265 |
| 3,329,876 | 7/1967 | Branco | 318—314 |
| 3,340,951 | 9/1967 | Vitt | 318—314 |
| 3,355,644 | 11/1967 | Goslin et al. | 318—341 |
| 3,356,921 | 12/1967 | Bradford et al. | 318—314 |

ORIS L. RADER, Primary Examiner

L. L. HEWITT, Assistant Examiner

U.S. Cl. X.R.

318—313